(12) United States Patent
Fujita et al.

(10) Patent No.: US 11,223,257 B2
(45) Date of Patent: Jan. 11, 2022

(54) ELECTRIC ROTARY MACHINE

(71) Applicant: HONDA MOTOR CO., LTD., Tokyo (JP)

(72) Inventors: Noriaki Fujita, Saitama (JP); Norifumi Yasuda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 82 days.

(21) Appl. No.: 16/657,043

(22) Filed: Oct. 18, 2019

(65) Prior Publication Data
US 2020/0127534 A1 Apr. 23, 2020

(30) Foreign Application Priority Data
Oct. 19, 2018 (JP) .............................. JP2018-197887

(51) Int. Cl.
*H02K 9/00* (2006.01)
*H02K 1/27* (2006.01)

(52) U.S. Cl.
CPC ............... *H02K 9/00* (2013.01); *H02K 1/276* (2013.01)

(58) Field of Classification Search
CPC ........ H02K 1/276; H02K 1/2766; H02K 1/32; H02K 9/00; H02K 9/005; H02K 9/19
USPC .......................................................... 310/52
See application file for complete search history.

(56) References Cited

U.S. PATENT DOCUMENTS

| 5,889,342 | A | 3/1999 | Hasebe et al. | |
|---|---|---|---|---|
| 2009/0261667 | A1* | 10/2009 | Matsubara | ........... H02K 1/2766 310/54 |
| 2011/0273040 | A1 | 11/2011 | Chamberlin et al. | |
| 2012/0305226 | A1 | 12/2012 | Chamberlin et al. | |
| 2015/0303774 | A1 | 10/2015 | Kitta et al. | |

(Continued)

FOREIGN PATENT DOCUMENTS

| CN | 105122606 A | 12/2015 |
|---|---|---|
| JP | H09-182374 A | 7/1997 |

(Continued)

OTHER PUBLICATIONS

Aug. 2, 2021, Chinese Office Action issued for related CN application No. 201910992443.6.

(Continued)

*Primary Examiner* — Alex W Mok
(74) *Attorney, Agent, or Firm* — Paratus Law Group, PLLC

(57) ABSTRACT

An electric rotary machine includes a rotor and a stator. The rotor includes a rotor shaft having a refrigerant flow path therein, a rotor core, a plurality of magnet pole portions, a first end plate and a second end plate. The stator includes a first coil end located radially outside the first end plate, and a second coil end located radially outside of the second end plate. The first end plate includes a first refrigerant discharge hole, a first groove portion communicating with the refrigerant flow path and communicating with the first refrigerant discharge hole, and a second groove portion communicating with the refrigerant flow path and the core through hole. The second end plate includes a second refrigerant discharge hole communicating with the refrigerant flow path via the core through hole and the second groove portion, without directly communicating with the refrigerant flow path.

6 Claims, 6 Drawing Sheets

(56) References Cited

U.S. PATENT DOCUMENTS

| | | | |
|---|---|---|---|
| 2016/0149450 A1 | 5/2016 | Horii et al. | |
| 2016/0322874 A1* | 11/2016 | Yoshinori | H02K 1/32 |
| 2017/0012503 A1* | 1/2017 | Okochi | H02K 1/32 |
| 2018/0062463 A1* | 3/2018 | Ito | H02K 1/24 |

FOREIGN PATENT DOCUMENTS

| | | | |
|---|---|---|---|
| JP | H09-182375 A | | 7/1997 |
| JP | 2009-219186 A | | 9/2009 |
| JP | 2011114986 A | * | 6/2011 |
| JP | 2012-210120 A | | 10/2012 |
| JP | 2013-526264 A | | 6/2013 |
| WO | WO 2015/019402 A1 | | 2/2015 |

OTHER PUBLICATIONS

Oct. 19, 2021, Japanese Office Action issued for related JP application No. 2018-197887.

* cited by examiner

ELECTRIC ROTARY MACHINE

CROSS-REFERENCE TO RELATED APPLICATIONS

This application is based on and claims priority under 35 USC 119 from Japanese Patent Application No. 2018-197887 filed on Oct. 19, 2018.

TECHNICAL FIELD

The present disclosure relates to an electric rotary machine.

BACKGROUND ART

With the recent increase in size of electric rotary machines, the deterioration of the performance of the electric rotary machine caused due to the heat generated from the magnet pole portion is not negligible, and accordingly, studies have been conducted to find a method of efficiently cooling the magnet pole portion of the rotor. Meanwhile, since the coils of the stator also generate heat, the coils of the stator also need to be cooled.

Japanese Unexamined Patent Application Publication Nos. 9-182374 and 9-182375 describe a rotor of an electric rotary machine including a rotor shaft in which a refrigerant flow path is formed, a rotor core, a magnet pole portion, and a pair of end face plates disposed on both end faces of the rotor core. In this rotor, a refrigerant is supplied to both end face plates from the refrigerant flow path of the rotor shaft, respectively. The refrigerant supplied to one end face plate is discharged from the other end face plate through a through hole formed in the rotor core. Further, it is described that the refrigerant supplied to the other end face plate is discharged from the one end face plate through the other through hole formed in the rotor core. As a result, it is possible to cool the coil ends on both sides of the stator that face the rotor, while cooling the rotor core from inside.

However, in the rotors of the electric rotary machines described in above-mentioned PTLs 1 and 2, it is difficult to uniformly supply refrigerant from the refrigerant flow path of the rotor shaft to one and the other end surface sides, and it is not possible to control flow rate distribution properly. In addition, it is necessary to process the refrigerant supply path extending in a radial direction from the refrigerant flow path at two positions of one and the other end surface sides of the rotor shaft, resulting in increased processing cost.

SUMMARY OF INVENTION

An aspect of the present disclosure provides an electric rotary machine capable of cooling the magnet pole portion of the rotor from the inside of the rotor core and appropriately cooling coils of a stator using the refrigerant discharged from the rotor core.

An embodiment of the present invention provides an electric rotary machine which includes:
a rotor, and
a stator disposed radially outside of the rotor,
wherein the rotor includes
a rotor shaft having a refrigerant flow path therein,
a rotor core including a rotor shaft hole through which the rotor shaft is inserted, a plurality of magnet insertion holes provided along a circumferential direction, and a core through hole penetrating in an axial direction,
a plurality of magnet pole portions formed of magnets inserted into the magnet insertion holes,
a first end plate disposed at one axial end side of the rotor core, and
a second end plate disposed at the other axial end side of the rotor core,
wherein the stator includes
a first coil end located radially outside of the first end plate, and
a second coil end located radially outside of the second end plate,
wherein the first end plate includes
a first refrigerant discharge hole,
a first groove portion communicating with the refrigerant flow path and communicating with the first refrigerant discharge hole, and
a second groove portion communicating with the refrigerant flow path and communicating with the core through hole, and
wherein the second end plate includes
a second refrigerant discharge hole communicating with the refrigerant flow path via the core through hole and the second groove portion, without directly communicating with the refrigerant flow path.

According to the above embodiment of the present invention, the magnet pole portions of the rotor can be cooled from the inside of the rotor core, and the coil of the stator can be properly cooled using a refrigerant discharged from the rotor core.

DESCRIPTION OF EMBODIMENTS

Figure 1:
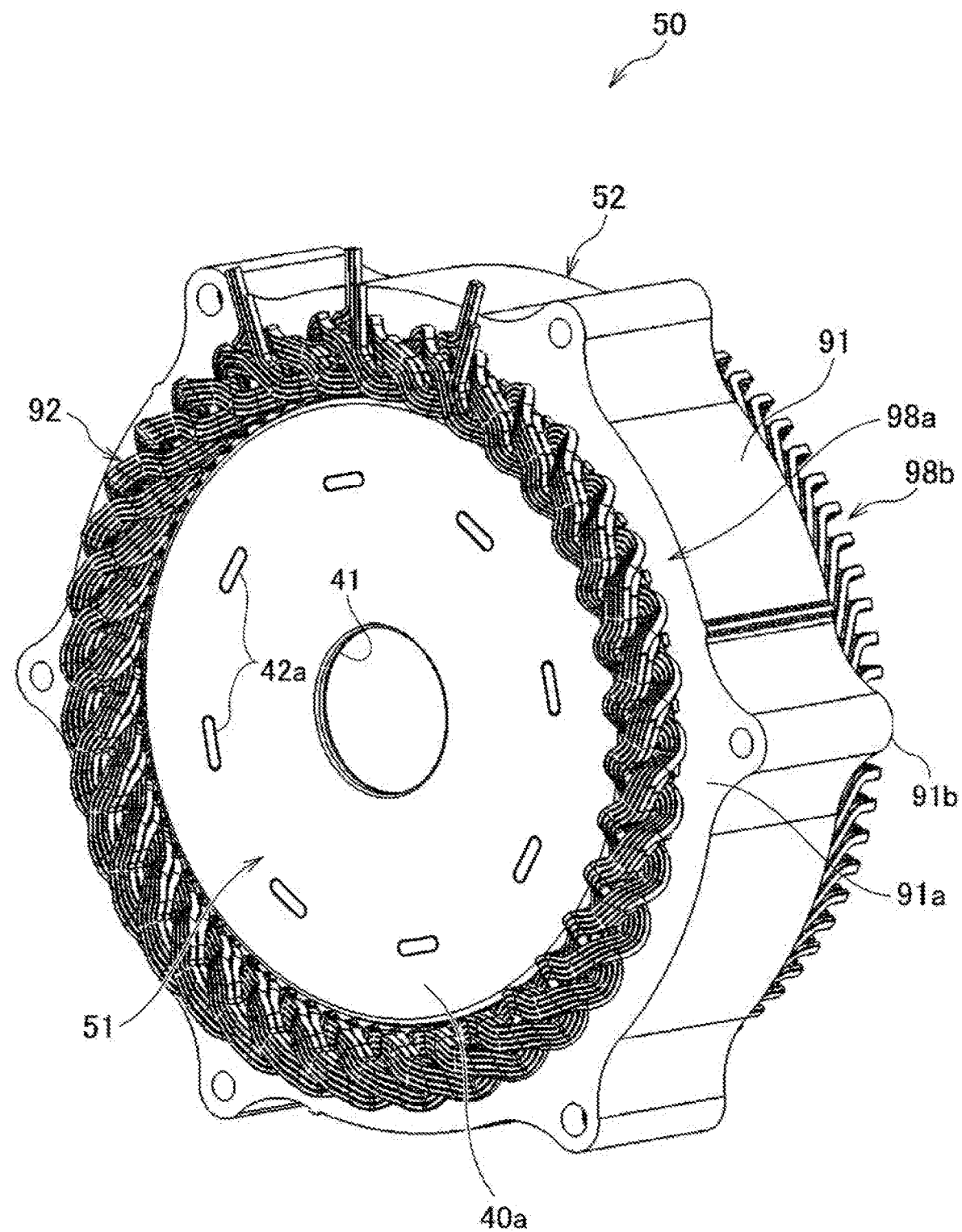
FIG. 1 is a perspective view showing an electric rotary machine according to a first embodiment of the present disclosure.
Figure 2:
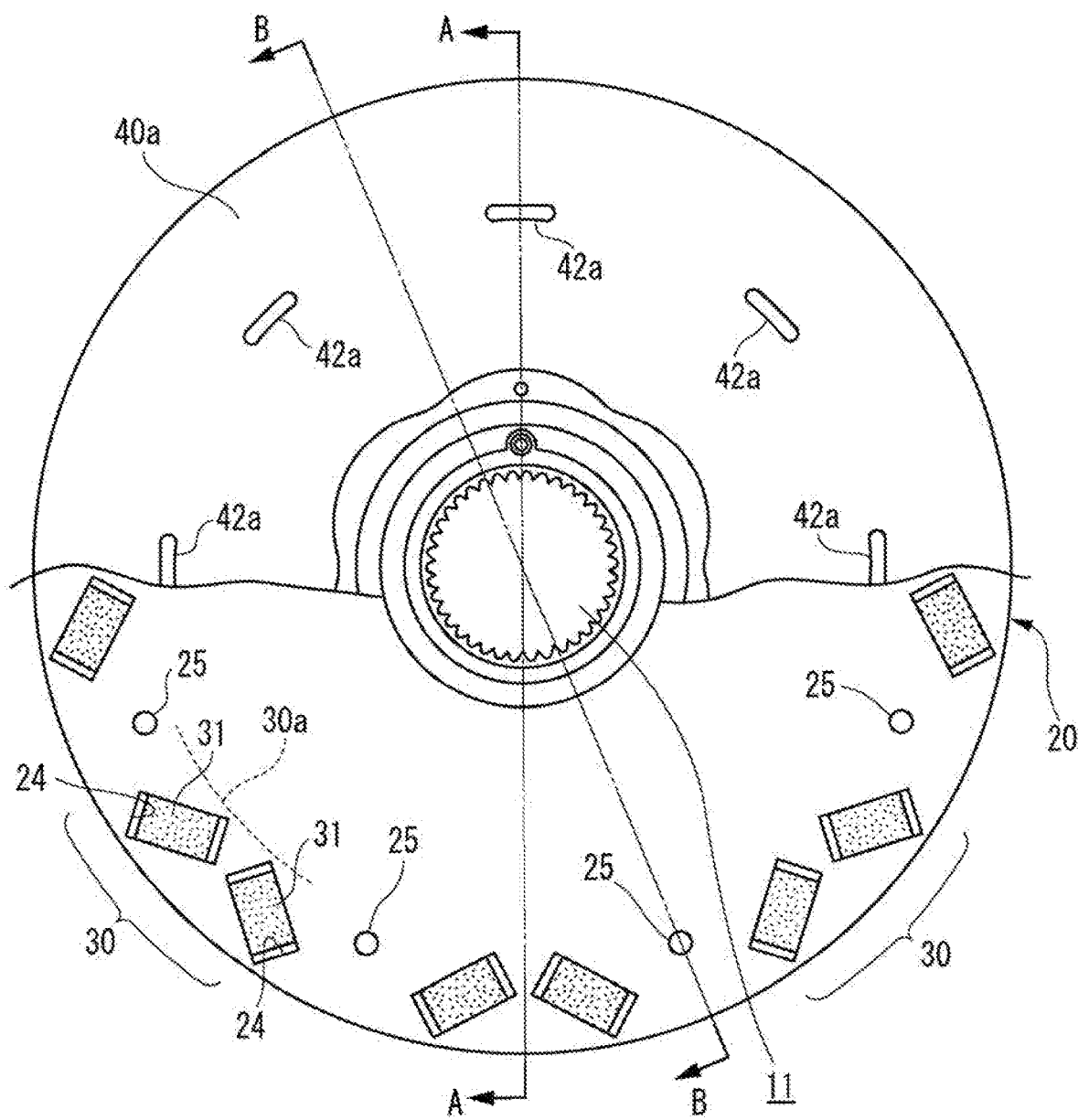
FIG. 2 is a front view showing a rotor of the electric rotary machine according to the first embodiment, from which a portion of a first end plate is cut away.
Figure 3:
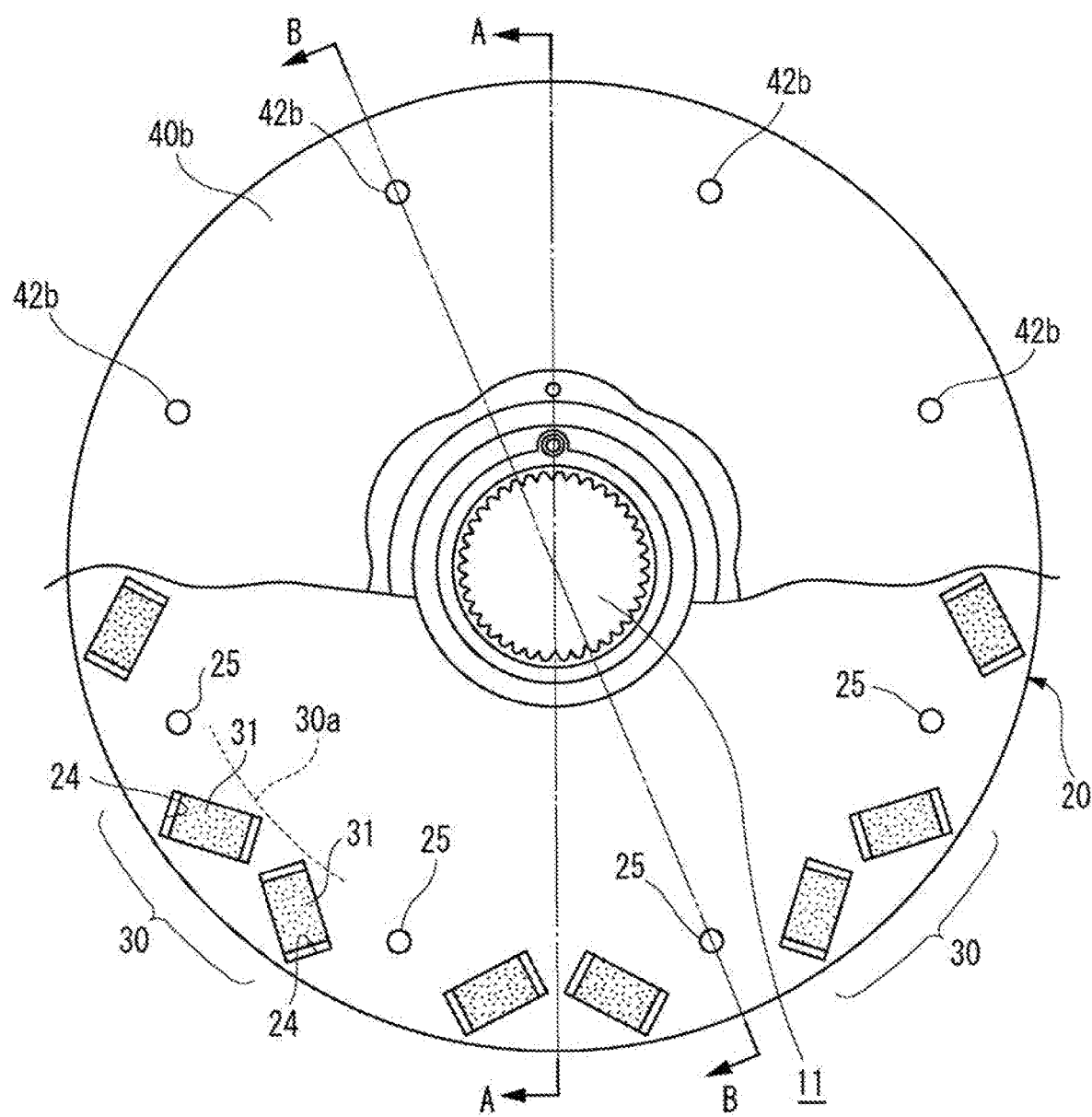
FIG. 3 is a rear view showing the rotor of the electric rotary machine according to the first embodiment, from which a portion of a second end plate is cut away.

Hereinafter, an electric rotary machine according to an embodiment of the present disclosure will be described based on the attached drawings. As shown in FIG. 1, the electric rotary machine 50 includes a rotor 51, and a stator 52 disposed to face an outer diameter side of the rotor 51 while defining a slight gap therebetween, and this is a so-called inner rotor type electric rotary machine.

[Rotor]

As shown in FIGS. 2 to 5, the rotor 51 according to the first embodiment includes a rotor shaft 10, a rotor core 20 supported by the rotor shaft 10, a plurality of magnet pole portions 30, a first end plate 40*a* disposed at one axial end side of the rotor core 20 and a second end plate 40*b* disposed at the other axial end side of the rotor core 20.

The rotor shaft 10 is formed with a refrigerant flow path 11 through which the refrigerant flows. The refrigerant flow path 11 extends in the axial direction inside the rotor shaft 10, and is formed so that the refrigerant can be supplied from the outside. As a refrigerant, automatic transmission fluid (ATF) is used, for example. The refrigerant flow path 11 is connected to a circulation path formed in a housing (not shown) that accommodates the electric rotary machine 50.

[Rotor Core]

The rotor core 20 is formed by stacking a plurality of electromagnetic steel plates formed by press processing in the axial direction, and joining the electromagnetic steel plates by caulking or adhesion, for example.

The rotor core 20 includes a rotor shaft hole 21 through which the rotor shaft 10 is inserted, and the plurality of magnet pole portions 30 provided on an outer peripheral portion of the rotor core 20.

The plurality of magnet pole portions 30 are formed along the circumferential direction at equal intervals to face the stator 52. Each of the magnet pole portions 30 is formed of two magnets 31 inserted into two magnet insertion holes 24 that are converged to a V-shape inwardly in the radial direction. The magnets 31 are permanent magnets such as neodymium magnets, for example. In addition, the magnet pole portion 30 may be formed of three magnets disposed in three magnet insertion holes that are disposed to be converged inwardly in the radial direction, or may be formed of one flat plate magnet or a circular arc magnet.

The rotor core 20 is provided with a plurality of core through holes 25 having a substantially circular shape in a front view and penetrating in the axial direction. The core through holes 25 are provided between the adjacent magnet pole portions 30 and located on the radially outer side than the innermost diameter portion 30a of the magnet pole portions 30.

[End Plate]

As shown in FIGS. 2 and 4 to 6, the first end plate 40a is disposed to face the end surface on one axial end side of the rotor core 20. An insertion hole 41 for inserting the rotor shaft 10 is formed at a center of the first end plate 40a, and a plurality of first refrigerant discharge holes 42a are formed at equal intervals in the circumferential direction on an outer peripheral portion of the first end plate 40a. The first refrigerant discharge holes 42a are located on a center position between each of the poles 30 in the circumferential direction and slightly inner side than the magnet pole portion 30 in the radial direction.

Further, the inner side surface of the first end plate 40a is provided with an annular refrigerant reservoir 43 formed on the rotor shaft 10 at an inner diameter side corner of the insertion hole 41 and communicating with refrigerant supply paths 12, a plurality of first groove portions 44 communicating with the refrigerant supply paths 12 and communicating with first refrigerant discharge holes 42a through the refrigerant reservoir 43, and a plurality of second groove portions 45 communicating with the refrigerant supply paths 12 and communicating with the core through holes 25 through the refrigerant reservoir 43.

The first groove portions 44 are provided in the same number as the first refrigerant discharge holes 42a, and extend in a straight line in the radial direction from the refrigerant reservoir 43 toward the first refrigerant discharge holes 42a. The second groove portions 45 are provided in the same number as the core through holes 25 and extend in a straight line in the radial direction from the refrigerant reservoir 43 toward the core through holes 25. The first groove portions 44 and the second groove portions 45 are alternately disposed at equal intervals in the circumferential direction. As a result, the refrigerant can be supplied from the refrigerant reservoir 43 to the first groove portions 44 and the second groove portions 45 in a well-balanced manner.

The second end plate 40b is disposed to face the end surface of the other axial end side of the rotor core 20. The insertion hole 41 for inserting the rotor shaft 10 is formed at the center of the second end plate 40b, and a plurality of second refrigerant discharge holes 42b are formed at equal intervals in the circumferential direction on the outer peripheral portion of the second end plate 40b. The second refrigerant discharge holes 42b are provided in the same number as the core through holes 25 provided between the adjacent magnet pole portions 30 and communicate with the core through holes 25. The second refrigerant discharge holes 42b communicate with the refrigerant flow path 11 through the core through holes 25 and the second groove portions 45 communicating with the core through holes 25, without directly communicating with the refrigerant flow path 11. Therefore, in the rotor shaft 10, the refrigerant supply paths 12 communicating with the first groove portions 44 and the second groove portions 45 of the first end plate 40a may be processed only on the first end plate 40a side, so that the processing of the rotor shaft 10 can be facilitated, and an increase in processing cost can be suppressed.

Therefore, the refrigerant flowing through the refrigerant flow path 11 is introduced from the refrigerant supply paths 12 to the refrigerant reservoir 43 and introduced from the refrigerant reservoir 43 to the first groove portions 44 and the second groove portions 45. The annular refrigerant reservoir 43 is provided at a junction portion between the first end plate 40a and the refrigerant supply paths 12 extending from the refrigerant flow path 11, so that the refrigerant is stably supplied from the refrigerant reservoir 43 to the first groove portions 44 and the second groove portions 45 over the entire circumference. Further, the refrigerant reservoir 43 is provided at a junction portion between the first end plate 40a and the refrigerant supply paths 12 extending from the refrigerant flow path 11, that is, at the inner diameter side of the rotor 51, so that loss of rotation balance can be suppressed.

Figure 4:
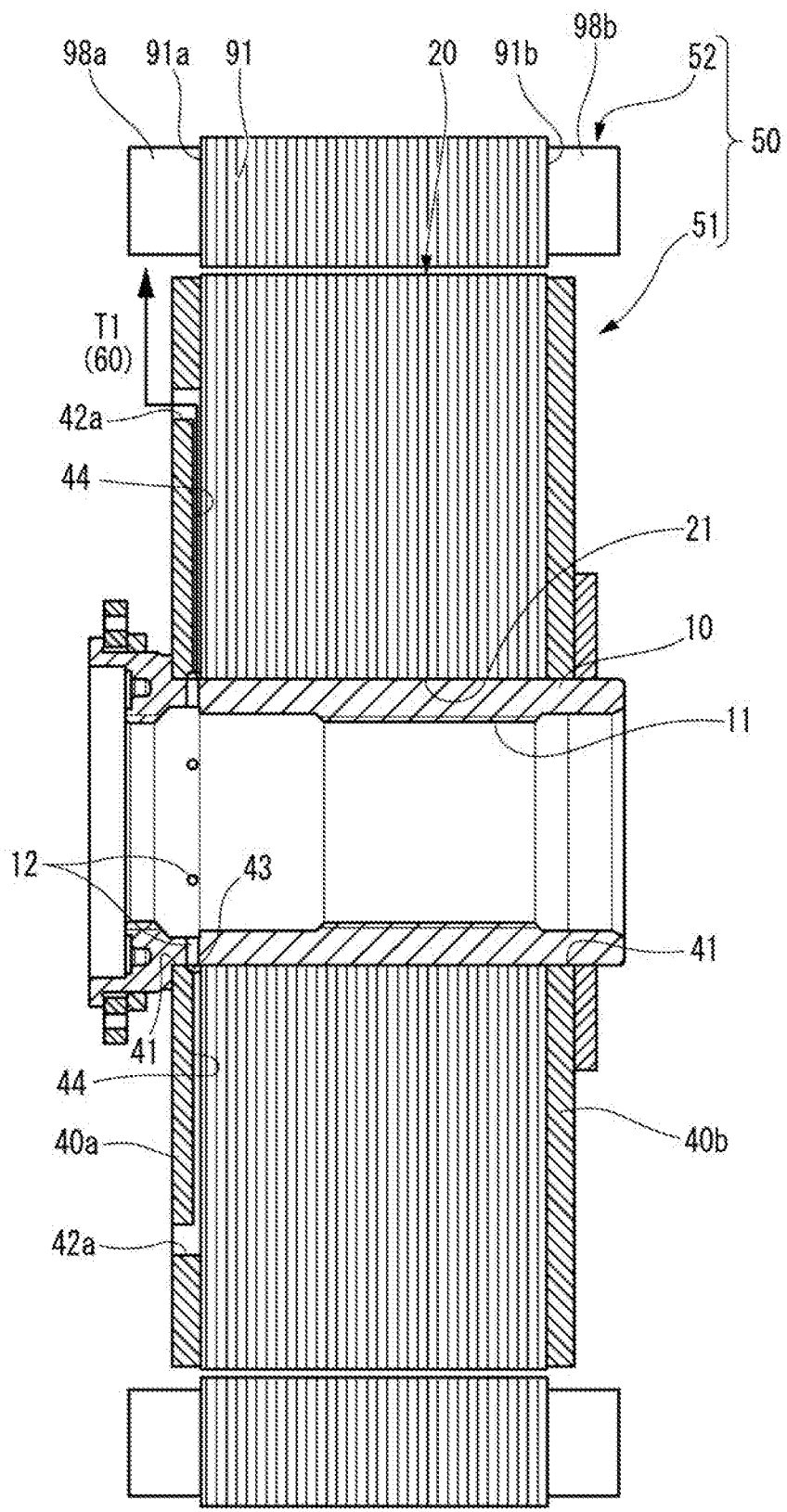
FIG. 4 is a cross-sectional view taken along the line A-A in FIGS. 2 and 3.

As indicated by T1 in FIG. 4, the refrigerant introduced into the first groove portions 44 is supplied to the first refrigerant discharge holes 42a of the first end plate 40a through the first groove portions 44 and is discharged from the first refrigerant discharge holes 42a.

Figure 5:
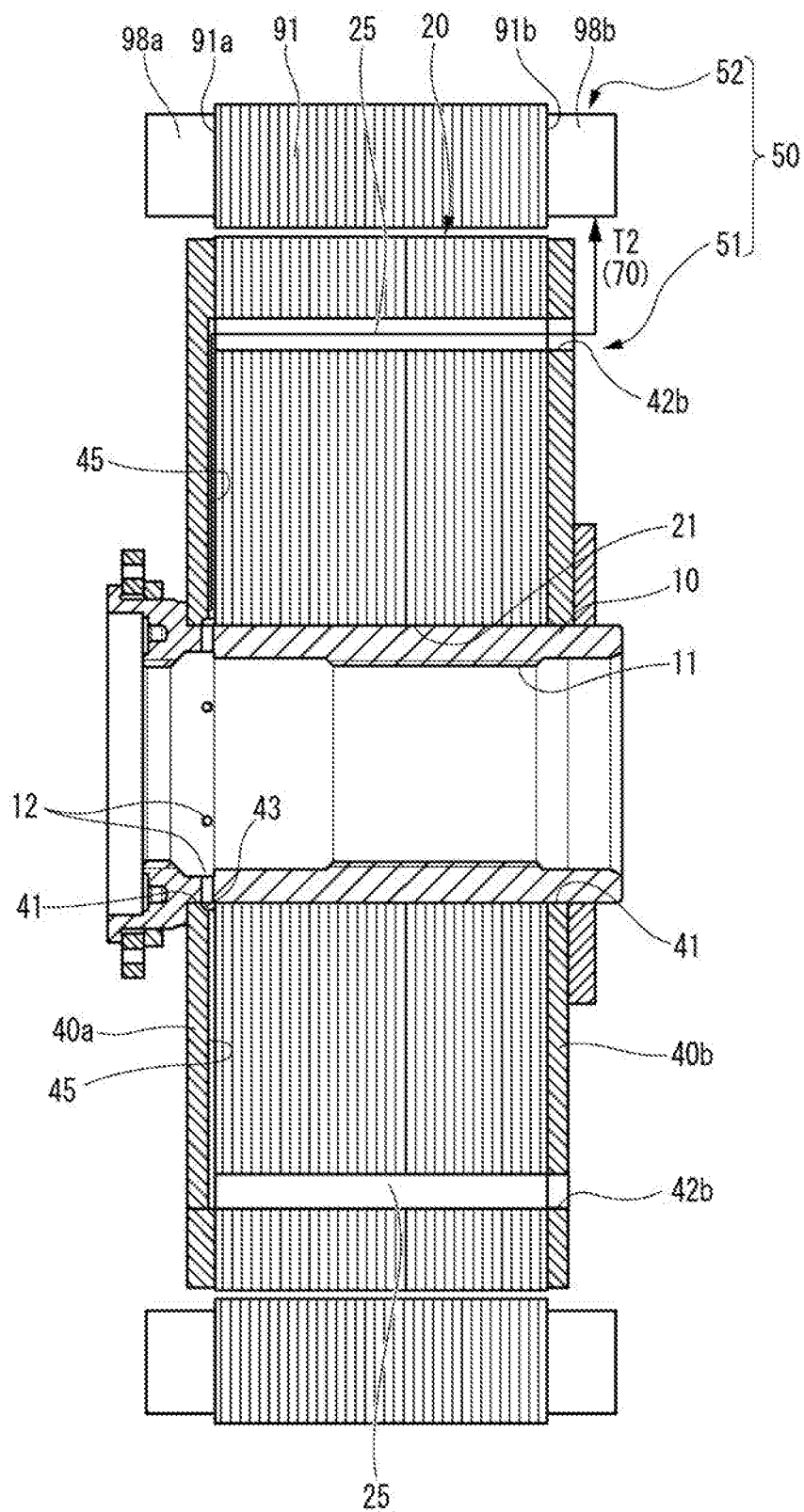
FIG. 5 is a cross-sectional view taken along the line B-B in FIGS. 2 and 3.
Figure 6:
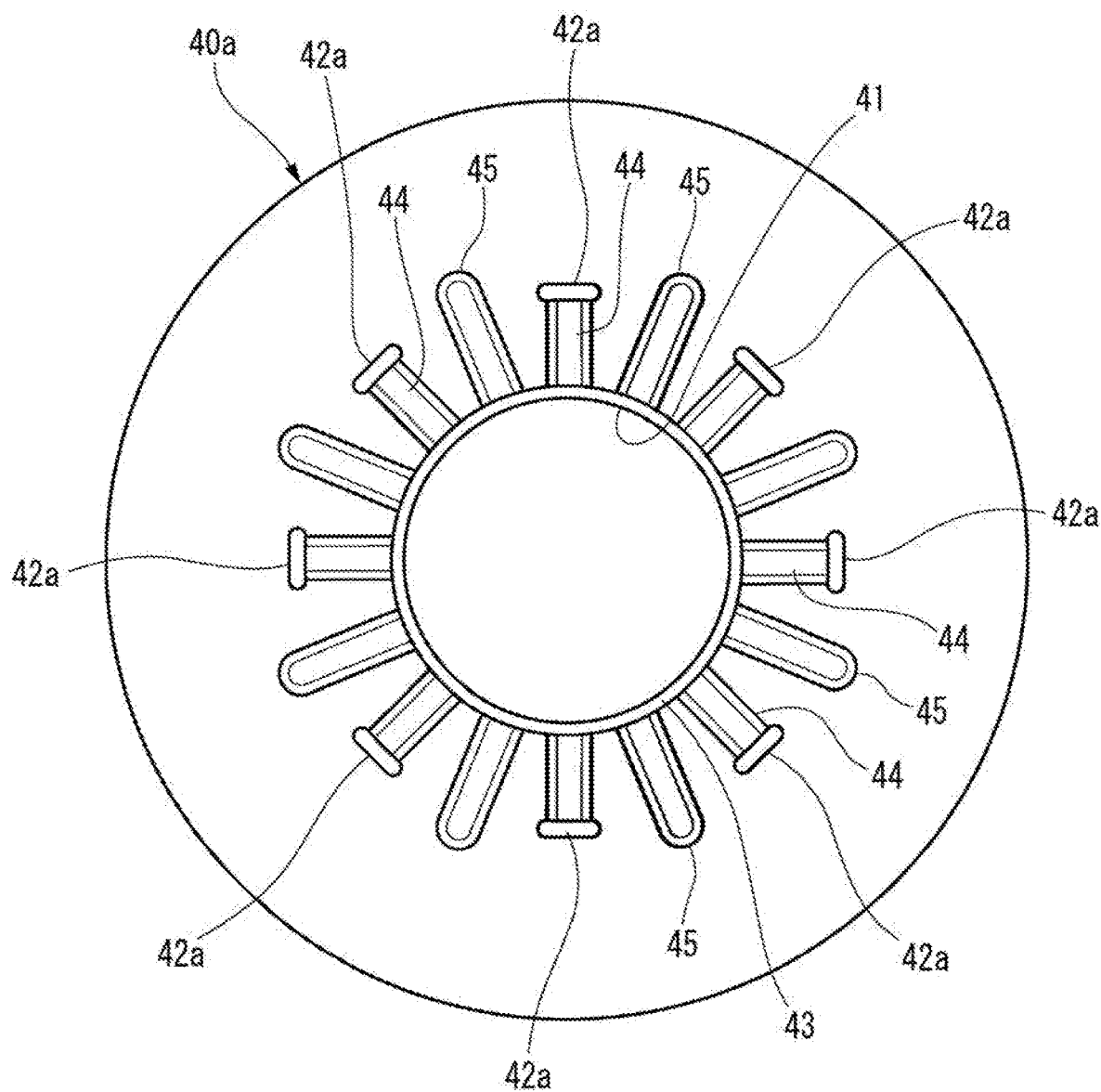
FIG. 6 is a view showing an inner side of a first end plate.

The refrigerant introduced into the second groove portions 45 is supplied to the core through holes 25 of the rotor core 20 through the second groove portions 45 as indicated by T2 in FIG. 5 and flows in an axial direction in the core through holes 25 from one side (the first end plate 40a side) toward the other side (the second end plate 40b side) in the axial direction. Thereafter, the refrigerant is supplied to the second refrigerant discharge holes 42b of the second end plate 40b and discharged from the second refrigerant discharge holes 42b.

[Stator]

The stator 52 includes a stator core 91 and coils 92 wound around a plurality of slots formed in the stator core 91. The coil 92 includes a first coil end 98a axially protruding from one end surface 91a side of the stator core 91 and a second coil end 98b axially protruding from the other end surface 91b side of the stator core 91. The first coil end 98a is located radially outside of the first end plate 40a, and the second coil end 98b is located radially outside of the second end plate 40b. Therefore, the refrigerant discharged from the first refrigerant discharge holes 42a of the first end plate 40a is supplied to the first coil end 98a, and the refrigerant discharged from the second refrigerant discharge holes 42b of the second end plate 40b is supplied to the second coil end 98b.

[Cooling Operation]

Next, the cooling operation of the electric rotary machine 50 will be described.

In the electric rotary machine 50 according to the present embodiment, the refrigerant pressure-fed by a refrigerant pump (not shown) is supplied to the rotor shaft 10 through the circulation path. The refrigerant supplied to the refrigerant flow path 11 is supplied to the refrigerant supply paths 12 penetrating the rotor shaft 10 in the radial direction.

The refrigerant in the refrigerant supply paths 12 is introduced into the refrigerant reservoir 43 of the first end plate 40a by centrifugal force acting on the refrigerant, and is introduced from the refrigerant reservoir 43 into the first groove portions 44 and the second groove portions 45.

As indicated by T1 in FIG. 4, the refrigerant introduced into the first groove portions 44 is discharged from the first refrigerant discharge holes 42a of the first end plate 40a through the first groove portions 44 and supplied to the first coil end 98a. The refrigerant introduced into the second groove portions 45 is supplied to the core through holes 25 of the rotor core 20 through the second groove portions 45 as indicated by T2 in FIG. 5, and flows in the core through holes 25 from one side (the first end plate 40a side) toward the other side (the second end plate 40b side) in the axial direction. The refrigerant passed through the core through holes 25 is discharged from the second refrigerant discharge holes 42b of the second end plate 40b and supplied to the second coil end 98b. As a result, the coils 92 of the stator 52, or particularly, the first coil end 98a and the second coil end 98b on both sides of the stator core 91 can be cooled using the refrigerant discharged from the rotor core 20.

Further, the core through holes 25 are disposed in the vicinity of the magnet pole portion 30, so that when the refrigerant flows axially in the core through holes 25 from one side (first end plate 40a side) to the other side (second end plate 40b side), the magnets 31 to be cooled preferentially from the viewpoint of heat resistance performance may be effectively cooled by heat exchange with the magnet pole portions 30.

According to the present embodiment, the refrigerant supplied from the refrigerant supply paths 12 of the rotor shaft 10 may be distributed to two paths, that is, to a first refrigerant supply path 60 (in the drawing, a path indicated by arrow T1) through which the refrigerant is supplied to the first coil end 98a from the first groove portions 44 through the first refrigerant discharge hole 42a, and a second refrigerant supply path 70 (in the drawing, a path indicated by arrow T2) through which the refrigerant is supplied to the second coil end 98b from the second groove portions 45 through the core through holes 25 and the second refrigerant discharge holes 42b. As a result, the first coil end 98a and the second coil end 98b on both sides of the stator 52 can be cooled. Further, the magnet pole portions 30 of the rotor 51 can be cooled from the inside by the refrigerant passing through the core through holes 25.

Further, the first refrigerant supply path 60 and the second refrigerant supply path 70 are provided separately, so that the refrigerant distributed by the refrigerant reservoir 43 can be supplied as it is to the first coil end 98a and the second coil end 98b without mixing with the refrigerant flowing through the first refrigerant supply path 60 and the refrigerant flowing through the second refrigerant supply path 70.

The amounts of refrigerant supplied to the first coil end 98a and to the second coil end 98b may be the same or different from each other. In order to change the amounts of the refrigerant supplied to the first coil end 98a and the second coil end 98b, the widths of the grooves of the first groove portions 44 and the second groove portions 45 may be changed, or the depths of the grooves of the first groove portions 44 and the second groove portions 45 may be changed, or the widths and the depths of the grooves of the first groove portions 44 and the second groove portions 45 may be changed.

For example, since the refrigerant flowing through the second refrigerant supply path 70 is supplied to the second coil end 98b after heat exchange with the magnet pole portions 30, it is assumed that the refrigerant has a temperature higher than that of the refrigerant of the first refrigerant supply path 60 supplied to the first coil end 98a. For this reason, the temperature of the first coil end 98a and the second coil end 98b can be made closer to each other by increasing the amount of refrigerant flowing through the second groove portion 45 to be greater than the first groove portion 44.

It is to be noted that the embodiment described above may be appropriately modified, improved, and the like. For example, the number, the position, and the shape of the first refrigerant discharge holes 42a, the second refrigerant discharge holes 42b, and the core through holes 25 may be appropriately changed. Further, the number, the position, and the shape of the first groove portion 44 and the second groove portion 45 may be appropriately changed.

At least the following matters are described in the present specification. It is to be noted that in embodiment described above, the corresponding components and the like are shown in parentheses, but is not limited thereto.

(1) There is provided an electric rotary machine including a rotor (rotor 51), and a stator (stator 52) disposed radially outside of the rotor, in which the rotor includes a rotor shaft (rotor shaft 10) having a refrigerant flow path 11 therein, a rotor core (rotor core 20) including a rotor shaft hole (rotor shaft hole 21) through which the rotor shaft is inserted, a plurality of magnet insertion holes (magnet insertion holes 24) provided along the circumferential direction, and a core through hole (core through hole 25) penetrating in the axial direction, a plurality of magnet pole portions (magnet pole portions 30) formed of magnets (magnets 31) inserted into the magnet insertion holes, a first end plate (first end plate 40a) disposed at one axial end side of the rotor core, and a second end plate (second end plate 40b) disposed at the other axial end side of the rotor core, the stator includes a first coil end (first coil end 98a) located radially outside of the first end plate, and a second coil end (second coil end 98b) located radially outside of the second end plate, in which the first end plate includes a first refrigerant discharge hole (first refrigerant discharge hole 42a), a first groove portion (first groove portion 44) communicating with the refrigerant flow path and communicating with the first refrigerant discharge hole, and a second groove portion (second groove portion 45) communicating with the refrigerant flow path and communicating with the core through hole, and the second end plate includes a second refrigerant discharge hole (second refrigerant discharge hole 42b) communicating with the refrigerant flow path via the core through hole and the second groove portion, without directly communicating with the refrigerant flow path.

According to (1), the magnet pole portions of the rotor are internally cooled by the refrigerant passing through the core through hole formed in the rotor core while flowing from the second groove portion of the first end plate to the second refrigerant discharge hole of the second end plate. Further, the first coil end of the stator is cooled by the refrigerant discharged from the first refrigerant discharge hole of the first end plate, and the second coil end of the stator is cooled by the refrigerant discharged from the second refrigerant discharge hole of the second end plate. Therefore, the magnet pole portions of the rotor can be internally cooled by the refrigerant supplied from the refrigerant flow path, and the coil ends on both sides of the stator can be appropriately cooled.

Further, since the second refrigerant discharge hole is not in direct communication with the refrigerant flow path and is in communication with the refrigerant flow path through the core through hole and the second groove portion, it is desirable that the rotor shaft is processed only on the first end plate side, with the refrigerant flow path and the communication groove (refrigerant supply path) communicating with the first groove portion and the second groove portion of the first end plate. Therefore, the processing of the rotor shaft can be facilitated, and an increase in processing cost can be suppressed.

(2) In the electric rotary machine according to (1), the first end plate has an annular refrigerant reservoir (refrigerant reservoir 43) at a junction portion with the refrigerant supply path (refrigerant supply path 12) extending from the refrigerant flow path, and the first groove portion and the second groove portion communicate with the refrigerant flow path via the refrigerant reservoir.

According to (2), the first groove portion and the second groove portion communicate with the refrigerant flow path through the annular refrigerant reservoir, so that the refrigerant is stably supplied from the refrigerant reservoir to the first groove portion and the second groove portion over the entire circumference.

Further, the refrigerant reservoir is provided at the junction portion between the first end plate and the refrigerant supply path extending from the refrigerant flow path, that is, at the inner diameter side of the rotor, so that loss of rotation balance can be suppressed.

(3) In the electric rotary machine according to (2), a first refrigerant supply path (the first refrigerant supply path 60) configured to supply a refrigerant from the first groove portion to the first coil end via the first refrigerant discharge hole, and a second refrigerant supply path (the second refrigerant supply path 70) configured to supply a refrigerant from the second groove portion to the second coil end via the core through hole and the second refrigerant discharge hole are provided separately.

According to (3), the first refrigerant supply path and the second refrigerant supply path are provided separately, so that the refrigerant distributed by the refrigerant reservoir may be supplied as it is to the first coil end and the second coil end without mixing with the refrigerant flowing through the first refrigerant supply path and the refrigerant flowing through the second refrigerant supply path with each other.

(4) In the electric rotary machine according to any one of (1) to (3), the rotor core is has a plurality of the core through holes, the first end plate has a plurality of first refrigerant discharge holes, a plurality of first groove portions communicating with the plurality of first refrigerant discharge holes, and a plurality of second groove portions communicating with the plurality of core through holes, the second end plate is provided with a plurality of the second refrigerant discharge holes communicating with the plurality of core through holes, and the plurality of first groove portions and the plurality of second groove portions are alternately disposed in the circumferential direction.

According to (4), the plurality of first groove portions and the plurality of second groove portions are alternately disposed in the circumferential direction, so that the refrigerant can be supplied to the first groove portion and the second groove portion in a well-balanced manner.

(5) In the electric rotary machine according to any one of (1) to (4), the first groove portion and the second groove portion have different groove widths.

According to (5), the amounts of refrigerant to be supplied to the first coil end and to the second coil end can be adjusted by changing the groove widths of the first groove portion and the second groove portion.

(6) In the electric rotary machine according to any one of (1) to (5), the core through hole is located on the radially outer side than the innermost diameter portion (innermost diameter portion 30a) of the plurality of magnet pole portions.

According to (6), it is possible to effectively cool the magnet, which is a heating element, by the refrigerant passing through the core through hole.

(7) In the electric rotary machine according to any one of (1) to (6), the core through hole is provided between the magnet pole portions adjacent in the circumferential direction.

According to (7), the core through hole is provided between the magnet pole portions adjacent in the circumferential direction, so that it is possible to cool the two magnet pole portions with one core through hole, and it is possible to reduce the processing process of the core through holes.

The invention claimed is:

1. An electric rotary machine comprising:
a rotor, and
a stator disposed radially outside of the rotor,
wherein the rotor includes
a rotor shaft having a refrigerant flow path therein,
a rotor core including a rotor shaft hole through which the rotor shaft is inserted, a plurality of magnet insertion holes provided along a circumferential direction, and a core through hole penetrating in an axial direction,
a plurality of magnet pole portions formed of magnets inserted into the magnet insertion holes,
a first end plate disposed at one axial end side of the rotor core, and
a second end plate disposed at the other axial end side of the rotor core,
wherein the stator includes
a first coil end located radially outside of the first end plate, and
a second coil end located radially outside of the second end plate, wherein the first end plate includes
a first refrigerant discharge hole,
a first groove portion communicating with the refrigerant flow path and communicating with the first refrigerant discharge hole, and
a second groove portion communicating with the refrigerant flow path and communicating with the core through hole,
wherein the second end plate includes
a second refrigerant discharge hole communicating with the refrigerant flow path via the core through hole and the second groove portion, without directly communicating with the refrigerant flow path,
wherein the rotor core has a plurality of the core through holes,
wherein the first end plate has a plurality of first refrigerant discharge holes, a plurality of first groove portions communicating with the plurality of first refrigerant discharge holes, and a plurality of second groove portions communicating with the plurality of core through holes,
wherein the second end plate is provided with a plurality of the second refrigerant discharge holes communicating with the plurality of core through holes, and
wherein the plurality of first groove portions and the plurality of second groove portions are alternately disposed in the circumferential direction.

2. The electric rotary machine according to claim 1, wherein
the first end plate has an annular refrigerant reservoir at a junction portion with a refrigerant supply path extending from the refrigerant flow path, and
the first groove portion and the second groove portion communicate with the refrigerant flow path via the refrigerant reservoir.

3. The electric rotary machine according to claim 2, wherein
a first refrigerant supply path configured to supply a refrigerant from the first groove portion to the first coil end via the first refrigerant discharge hole, and
a second refrigerant supply path configured to supply a refrigerant from the second groove portion to the second coil end via the core through hole and the second refrigerant discharge hole are provided separately.

4. The electric rotary machine according to claim 1, wherein
the first groove portion and the second groove portion have different groove widths.

5. The electric rotary machine according to claim 1, wherein
the core through hole is located on a radially outer side than an innermost diameter portion of the plurality of magnet pole portions.

6. The electric rotary machine according to claim 1, wherein
the core through hole is provided between the magnet pole portions adjacent in the circumferential direction.

* * * * *